(12) United States Patent
Yarden

(10) Patent No.: US 9,538,729 B2
(45) Date of Patent: Jan. 10, 2017

(54) CATTLE MONITORING FOR ILLNESS

(71) Applicant: Medisim, LTD., Neve Ilan (IL)

(72) Inventor: Moshe Yarden, Neve Ilan (IL)

(73) Assignee: Medisim, LTD. (IL)

( * ) Notice: Subject to any disclaimer, the term of this patent is extended or adjusted under 35 U.S.C. 154(b) by 58 days.

(21) Appl. No.: 14/681,689

(22) Filed: Apr. 8, 2015

(65) Prior Publication Data

US 2015/0282457 A1 Oct. 8, 2015

Related U.S. Application Data

(60) Provisional application No. 61/976,690, filed on Apr. 8, 2014.

(51) Int. Cl.
*A01K 29/00* (2006.01)
*A01K 11/00* (2006.01)
*A61D 17/00* (2006.01)

(52) U.S. Cl.
CPC .......... *A01K 29/005* (2013.01); *A01K 11/004* (2013.01); *A01K 11/006* (2013.01); *A61D 17/00* (2013.01); *A61D 17/002* (2013.01)

(58) Field of Classification Search
CPC .... A01K 29/005; A01K 11/004; A01K 11/006
See application file for complete search history.

(56) References Cited

U.S. PATENT DOCUMENTS

| | | |
|---|---|---|
| 3,070,773 A | 12/1962 | Woolston et al. |
| 3,774,594 A | 11/1973 | Huszar |
| 3,781,837 A | 12/1973 | Anderson et al. |
| 3,972,320 A | 8/1976 | Kalman |
| 4,075,632 A | 2/1978 | Baldwin et al. |
| 4,411,274 A | 10/1983 | Wright |
| 4,471,354 A | 9/1984 | Smith |
| 4,592,000 A | 5/1986 | Ishizaka et al. |
| 4,618,861 A | 10/1986 | Gettens et al. |
| 4,854,328 A | 8/1989 | Pollack |
| 4,865,044 A | 9/1989 | Wallace et al. |

(Continued)

FOREIGN PATENT DOCUMENTS

| | | |
|---|---|---|
| CN | 102961123 A | 3/2013 |
| CN | 203206907 U | 9/2013 |

(Continued)

*Primary Examiner* — Andrew Bee
(74) *Attorney, Agent, or Firm* — Lerner, David, Littenberg, Krumholz & Mentlik, LLP

(57) ABSTRACT

Disclosed are a system, device and process for monitoring physical and physiological features of livestock through a unique monitoring system and device. Basic and Smart tags are placed on livestock to monitor, among other things, temperature, movement, location, posture, pulse rate, and other physical and physiological features. Information is relayed from Basic tags, in one embodiment, to Smart tags that requests the information and receives the information from the basic tags. Smart tags send information to a mobile unit controller and/or home base so that requested information is sent to an end user that monitors the livestock for signs of illness. Potentially ill animals are segregated from the herd for further evaluation and minimization of exposure risk to the rest of the herd. This early detection system saves livestock and ensures a healthier herd for livestock farmers.

13 Claims, 12 Drawing Sheets

(56) References Cited

U.S. PATENT DOCUMENTS

| | | | |
|---|---|---|---|
| 4,866,621 A | 9/1989 | Ono | |
| 5,203,345 A | 4/1993 | Kennedy et al. | |
| 5,818,354 A * | 10/1998 | Gentry | A01K 11/006 |
| | | | 119/220 |
| 6,280,397 B1 | 8/2001 | Yarden et al. | |
| 6,292,685 B1 | 9/2001 | Pompei | |
| 6,439,768 B1 | 8/2002 | Wu et al. | |
| 7,597,668 B2 | 10/2009 | Yarden | |
| 2002/0010390 A1 | 1/2002 | Guice et al. | |
| 2004/0061606 A1* | 4/2004 | Gronvold | A01J 5/007 |
| | | | 340/539.11 |
| 2005/0209526 A1 | 9/2005 | Ingley et al. | |
| 2007/0239038 A1 | 10/2007 | Nicolaescu et al. | |
| 2009/0066568 A1* | 3/2009 | Britz | A01K 11/008 |
| | | | 342/357.36 |
| 2009/0312667 A1 | 12/2009 | Utsunomiya et al. | |
| 2010/0198023 A1* | 8/2010 | Yanai | G06F 19/3418 |
| | | | 600/301 |
| 2011/0298619 A1* | 12/2011 | O'Hare | A01K 11/008 |
| | | | 340/573.1 |
| 2012/0326874 A1* | 12/2012 | Kwak | A01K 11/006 |
| | | | 340/573.3 |
| 2013/0222141 A1* | 8/2013 | Rhee | G06F 19/3418 |
| | | | 340/573.3 |
| 2016/0135426 A1* | 5/2016 | Harty | A61B 5/0022 |
| | | | 340/573.3 |

FOREIGN PATENT DOCUMENTS

| | | |
|---|---|---|
| WO | 2013082227 A1 | 6/2013 |
| WO | 2014040999 A1 | 3/2014 |

* cited by examiner

CATTLE MONITORING FOR ILLNESS

CROSS-REFERENCE TO RELATED APPLICATION

The present application claims the benefit of the filing date of U.S. Provisional Patent Application No. 61/976,690 filed Apr. 8, 2014, the disclosure of which is hereby incorporated herein by reference.

FIELD OF INVENTION

The present invention is generally directed to a system, method, and device in the field of diagnostic tools for livestock. More particularly, this invention relates to a system, method, and device having data tags applied. to livestock. for non-invasively retrieving health related data regarding the livestock.

BACKGROUND

One of the most common methods used for raising cattle is through the use of feed lots where cattle is kept in facilities and fattened. When the cattle or other livestock reach a target weight, they are then sent to slaughter.

Cattle, for example, intended for feed lots are bought from a cattle grower and delivered to the feed lot site or alternatively to an on-site feed lot such as a privately owned farm that fattens their own cattle. Upon arrival to these sites, cattle undergo various treatments and procedures, such as: veterinary disease check, castration, weight check and other related health procedures. One of the procedures that are not only part of the farm's routine but is also mandatory by the law in various countries, is the tagging of the animal. Upon arrival at a feed lot, the animal typically is required to receive an ID tag. Such tag is usually connected to the animal's ear and may be linked to that animal's history through its previous ID given at any previous location.

The live stock can be held in feed lots or feed yards whether in a single lot or multiple lots designed for animal feeding operation for a long duration of time. A feed lot may contain varying amounts of animals. Typically 10-100 animals are held per lot. A feed lot's typical dimensions are in the range of 30×30 m to 100×100 m. A feed lot typically contains all the necessary elements for the animal such as water, food and other essentials. The feed lot is routinely accessed by the feed lot staff in order to ensure animal's welfare, health and other needs.

Large feeding operation sites are often comprised of feed lot grids that are a row of feed lots enclosed by fences, in proximity to a service road. Such sites are typically located in far rural areas and usually far off from the farm offices and infrastructures. A single farm can manage several feed lot sites that are separated from one and another other.

A significant part of livestock management is the necessity to monitor and treat the livestock for disease and illness. Both beef cattle and milk cattle are at risk to become infected with one or more of the various diseases occurring in animals.

Cattle like other livestock animals are prone to disease that causes several challenges. The first challenge is economic—ill cattle for example requires additional special treatment, such as human labor for the separation and treatment, special equipment and medicine are also required. In some cases, the disease will end in the animal's death— causing more economical loss. A second challenge caused by animal illness is the risk for zoonotic diseases or namely diseases that can be transmitted from animal to humans. Such diseases might lead not only to economic damage, but also lead to a hazard to human health.

Different diseases are caused by bacteria, virus or other agents. Cattle disease influences different systems in the organism such as the respiratory, digestive, reproductive, neurological or other systems and can be expressed by a large variety of symptoms. Such symptoms can include, but not limited to: coughing, nasal and eye discharge, salivation, depression, lack of appetite and dullness, as well as other symptoms. In addition, one of the more significant symptoms leading to a diagnosis of disease is animal's high fever.

As the disease goes undiagnosed and untreated, it causes greater damage to tissues and organs which might eventually become permanently damaged. If identified early enough, the disease may be treatable by various means, such as medications or other methods. An early identification of an ill herd member will allow an early onset of treatment, and thus may:

1. Lower the chances of contamination to other members in the herd
2. Lead to less complications and tissue damage
3. Lead to less chances for future disease relapses
4. Lower the mortality rate One of the techniques currently and commonly used for the identification of sick cattle is a visual method. The farm staff visually examines the live stock to check for any changes in the animal's appearance or behavior. While such a visual method is based on the logic that a sick animal should express different behavior or illness symptoms, it has several significant drawbacks.

The visual scanning solution lacks an objective and clear parameter for illness identification. The subjective visual check might be false-negative, namely—the person scanning the living stock might miss a sick animal due to lack of experience in identifying the characteristic signs and symptoms, cattle attempt to hide or mask signs of disease, or other reasons. On the other hand, a false-positive event of disease identification might also occur. Such case might lead to a waste of different resources and unnecessary medication treatment to the animal. Also, visual identifiable symptoms might occur relatively late in the disease course beyond the point of recovery for the animal.

Therefore, there is a need for a system capable for early detection of sick cattle and efficient transmission of the information to the farm staff.

Feed lots, often are located in rural areas with minimal technical infrastructure for maintenance or support. The cost of any monitoring system must be considered, as cost sensitivity in this industry is very high. The environmental conditions such a system needs to withstand are very tough. Environmental conditions, include, but are not limited to, extreme high and low temperature, dust, humidity, mud and dirt. Therefore any solution must address at least these needs.

SUMMARY OF THE INVENTION

The current invention is an effective system, method and device for early and objective identification of cattle or other livestock suspected of being ill, by using data sampled from the animal and related to its health and/or wellbeing. The technique to achieve this target entails monitoring of different signs or symptoms which are characteristic to ill cattle, such as high fever and lack of appetite, movement decrease or other types of behavior. These signs and symptoms are monitored by a dedicated system (CMS—cattle monitoring system), that measures the relevant data, process it and transmits it, together with the ID of the relevant cattle or animal to the farm staff in charge of the animal's welfare.

Provided with such information, the farm staff will be able to take different actions in order to verify the animal's health state and if necessary withdraw the animal from the herd or feed lot for a more thorough examination. Thus, a fast and efficient treatment is assured.

The system is designed to be implemented at very low cost, with minimal or no infrastructure requirements in the feed lot itself. The Cattle Monitoring System (also referred herein as CMS) consists of several key components. These components, include, but are not limited to, a Basic tag (also denoted herein as BT), Smart tag (also denoted herein as ST), Mobile unit (also denoted herein as MU)and PC unit.

The foregoing features are achieved and other features and advantages of the present invention will become more apparent in light of the following detailed description of exemplary embodiments thereof, as illustrated in the accompanying drawings.

BRIEF DESCRIPTION OF THE DRAWINGS

In the drawings, wherein similar reference characters denote similar elements throughout the several views.

DETAILED DESCRIPTION

The invention will now be described in detail with reference to the accompanying drawings. The present invention relates to a system and method and device for monitoring and tracking the wellbeing, health, and activity of livestock either remotely, mobile, or at a stationary post.

Figure 1:
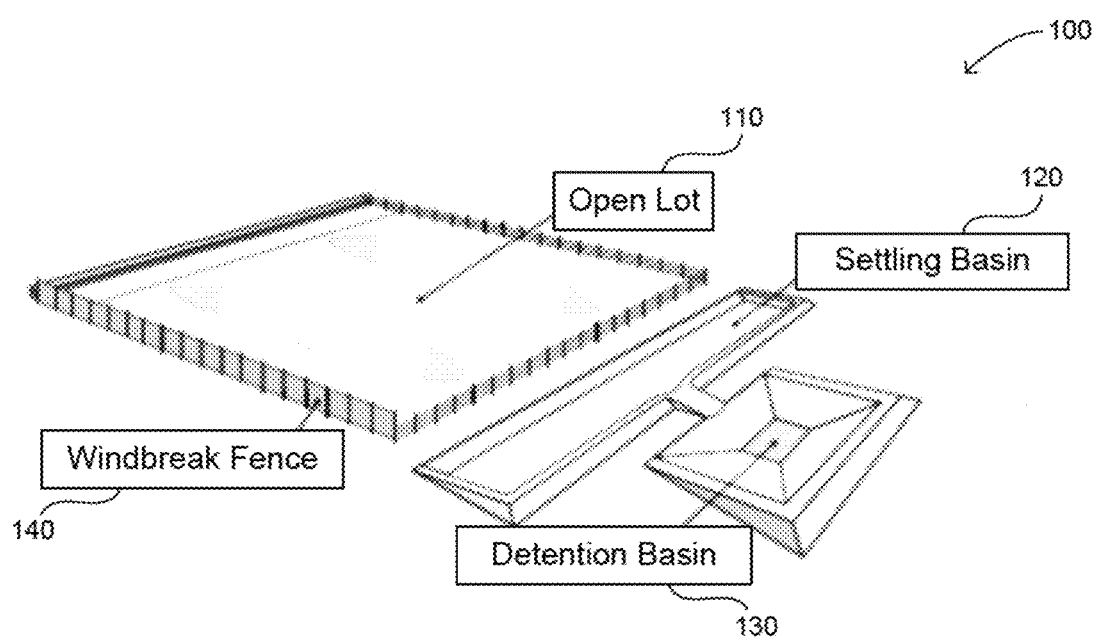
FIG. 1 shows an illustration of an open feed lot structure.

Shown in FIG. 1 is an illustration of a typical open feed lot structure 100. Lot 100 has an open lot 110 surrounded by windbreak fence 140. The fence secures the livestock in open lot 110. Also shown is a settling basin 120 connect to a detention basin 130. The detention basin 130 is typically where livestock that is sick or shows signs or symptoms of being ill are kept for further observation and evaluation. The detention basin 130 also serves to separate the livestock from the other livestock animals so as to minimize any outbreak of illness or spread of any contagious illness. Early detection of any illness is important to minimize the spread of any illness to the rest of the livestock.

Figure 2:
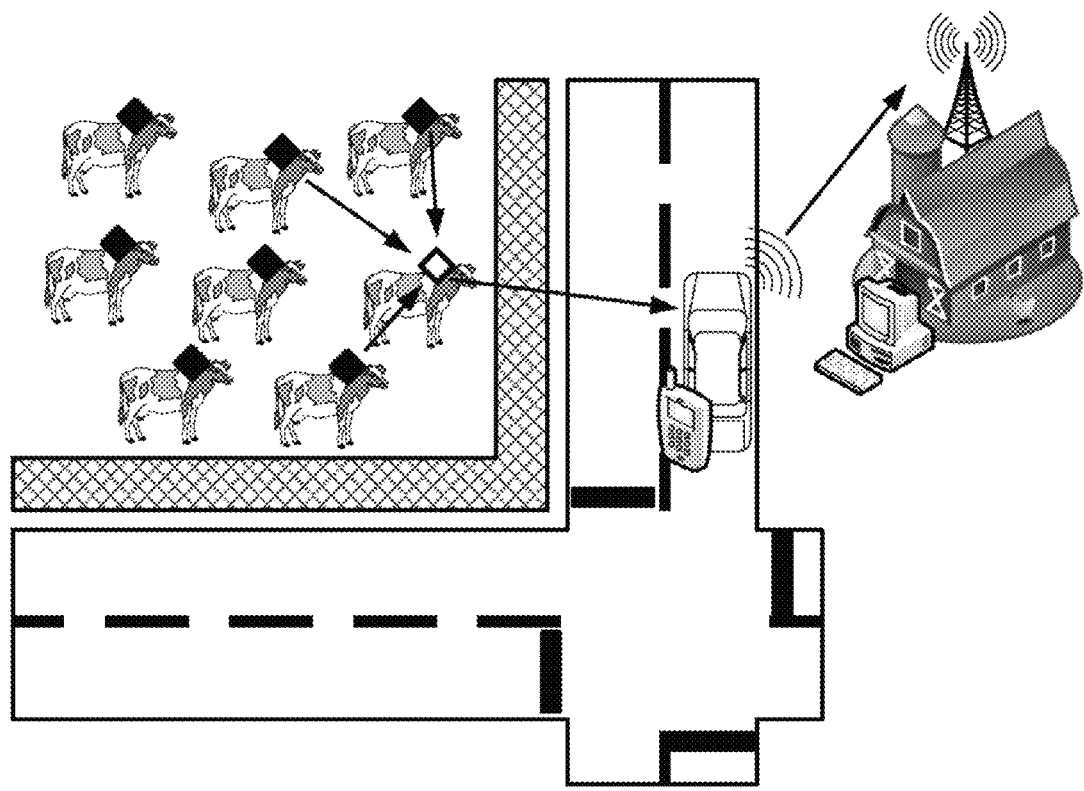
FIG. 2 shows one embodiment of a general overview of a system and method for sampling livestock information and transmitting the information to mobile and/or stationary units.

FIG. 2 illustrates a description of various information collected from livestock through a Smart Tag (or Relay Tag) and a Basic Tag. Shown in FIG. 2 are cows with Smart Tags and Basic Tags in an open lot. A mobile unit portable by a vehicle or other eMobile means can monitor several cows. Alternatively or in concert with, a stationary base wither in a farm or other structure may act as the headquarters with a personal computer or other device and a receiving antenna to receive signals from the tags. The communication flow can be from the tags to the mobile unit to the stationary headquarters or to the mobile unit and/or stationary headquarters directly, depending on the implementation of the invention.

Figure 3:
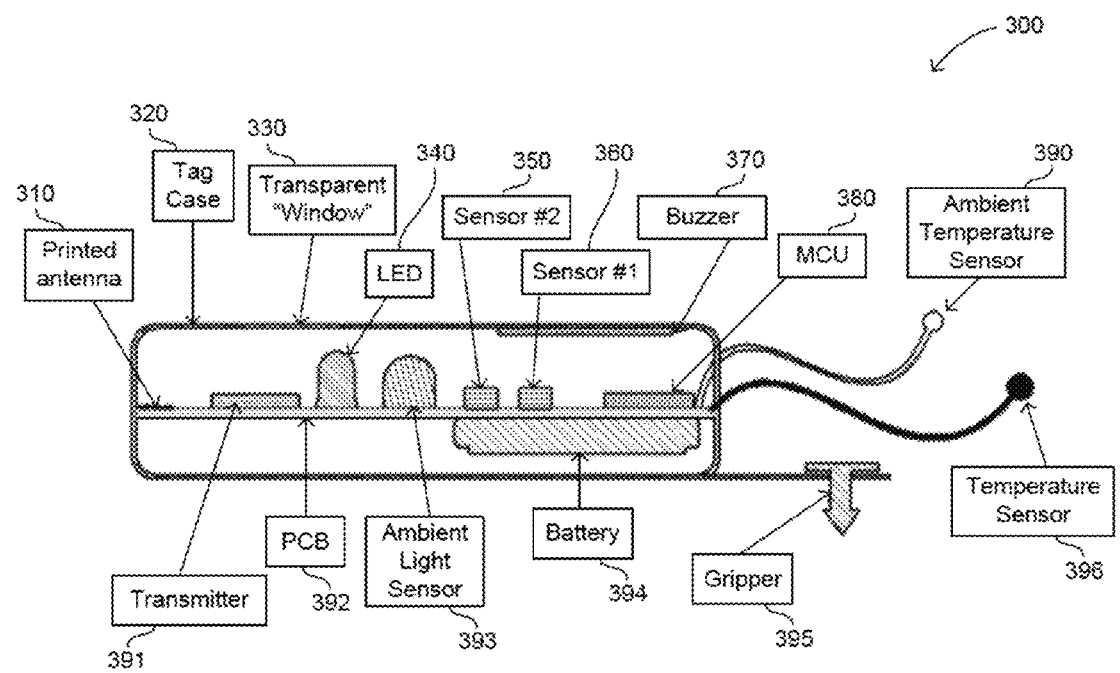
FIG. 3 shows a schematic diagram of one embodiment of a tag structure shown in FIG. 2.

FIG. 3 shows a side view of the insides of a basic tag structure. The basic tag 300, or BT, is used for the measurement and transmission of information relevant to the animal's health and well-being. For that purpose it comprises a temperature sensor 396 and/or at least one more sensors; sensor 350, sensor 360, used to measure parameters of motion, feeding, behavior, temperature, or other features, as detailed herein. Sensor 390 is used to measure ambient temperature.

Figure 4:
FIG. 4 shows an illustration of a livestock animal with the tag in FIG. 3.

The data obtained from the different sensors sensor 350, sensor 360, sensor 390 and sensor 396 together with the animal's ID number is then transmitted to the Smart Tag 410 or ST 410 on animal 400 in FIG. 4, operating as a relay station between the basic tag units 300 and the mobile unit, which collects the data from all of the animals being tagged. The smart tag also performs all the basic tag functions. Thus, the cattle which carry the Smart Tag can also be monitored as the cows with the basic tag.

In one embodiment, the ST processes the data received from the BT in order to provide an evaluation of the health status and other status or conclusions regarding cattle's status. Yet, in another embodiment, data is analyzed by the BT unit and the transmission to the ST unit includes only indication on the cattle status which carries the BT together with the relevant ID number.

As shown in FIG. 2, the mobile unit is only temporarily present in the area of every feed lot (mobile by car or manually), and thus it is used for an occasional and periodic data collection from the tags. The collected data is further transferred to the PC unit, used to process and store it for the system use.

The PC unit may transfer different necessary information to the mobile unit, such as future transmission timings, instructions for feed lot worker or others.

In order to implement the Cattle Monitoring System or CMS in a feed lot, it is necessary to execute an enlistment procedure, comprised of two main steps:

1. Attaching a tag (simple/basic tag or smart tag) to every cattle unit. The tag may be attached to the cattle's ear or other suitable location.
2. Creating a database of all the tags.
   The database may be carried on:
   a. Smart tags (containing all the simple tags in their reception range), and/or
   b. MU, that may contain a database of all the STs in the system, and/or all the BTs related to every ST.
   c. PC, containing a database of all the STs in a particular feed lot and all BTs related to a certain ST. In case of a farm that contains more than a single feed lot location and/or more than a single MU, the PC may contain also a database of MUs related to a specific feed lot area.

The implementation of the tags into the system's database may be done by recording every new active tag in the area of the mobile unit or MU into the database, and distributing it according to the required specifications:

Basic or smart tag
   If basic tag—what smart tag it is related to data recorded in the MU is then downloaded or transmitted to the system PC.

The basic tag as seen in FIG. 3 is the fundamental unit of the system, containing the necessary components for cattle monitoring and data transmission. Basic tag 300 components include, but are not limited to, temperature sensor 396, Transmitter 391, microcontroller unit (MCU) 380, and Memory (ID and data storing) that may also be in the MCU 380.

Optionally, the basic tag 300 may also contain: Transceiver or transmitter 391, Led light emitting diodes 340, Buzzer 370, Ambient temperature sensor 390, Ambient light sensor 393, Motion sensor or Sensor (#1) 360 (in a form of: Piezo electric/piezo resistive sensor, accelerometer, tilt sensor, GPS, or possibly a combination between at least two of these sensors), Proximity sensor or Sensor (#2) 350 (in a form of a capacitive, inductive, magnetic, photoelectric, ultrasound, RF or other type of proximity sensor, or possibly a combination between at least two of these sensors) and Battery 394.

The BT or ST tag is comprised from the tag case 320, the electrical components such as a printed circuit board (PCB) 392 and the gripper 395 that is used to attach to the animal subject. The case is designed to protect the components from the feed lot environment, and the dimensions of it allow placing it on an animal. A printed antenna 310 may also be used in the tag. A transparent window 330 is used to see warning lights such as LED 340 and/or Ambient light sensor 393. Custodians of the livestock may also hear warning of a potentially ill livestock through sounds made in buzzer 370.

The components shown in FIG. 3 may also be utilized for both a BT and/or ST tag and perform the tag's different functions: data storing and measurement, optionally—data processing and data transmission, as detailed herein.

Optionally, sensor #1 may be a motion sensor and sensor #2 may be a proximity sensor, or both sensors may be of the same kind (proximity or motion). Optionally, the tag may include more than two sensors.

The gripper 395 is intended to connect the tag to the animal. The tag 300 may include a printed or recessed ID number that corresponds to the ID stored in the BT memory.

Basic Tag Functionality
The basic tag 300 might be placed on the cattle's body (ear, neck, tail or any other body part). The basic tag's main functionalities are:

Cattle ID
Cattle illness-related data measurement
Optionally—data processing
Data transmission
Alarm display to farm staff ¶
Cattle ID Every tag includes a specific and unique identification number burned into the tag memory or MCU. The ID number might also be stamped on the external side of the tag, visual to the farm staff. The tag's ID is transmitted to the ST in conjunction with the other information regarding the specific cattle, such as cattle status and/or measured temperature and movements (as specified and detailed herein).

During the reception and enlisting process, every tag ID is attributed to specific cattle, allowing its history and particular feed lot tracking, and/or the particular ST it should transmit to. The full list of BTs, also as information regarding to which ST every BT is related (based on ID received for the specific cattle upon arrival), is saved in the system database as detailed herein.

Cattle-Illness-Related Data Measurement Functionality
Temperature Measurement.

The basic tag contains a temperature sensor 396 (in a form of a thermistor or, optionally, another type of sensor) measuring the animal's temperature. The measurement might be performed continuously with a predetermined duty cycle, during all day and night, in order to allow a prompt tracking of temperature alterations. In some embodiments the duty cycle of temperature measurement may be adaptive, according to the battery status and/or environment conditions in order to save battery life. The information gathered is then analyzed and transmitted in its raw form to a Smart Tag (ST Unit), in conjunction with the specific cattle ID, at every pre-determined period of time, using RF communication, microwave transmission or the like. In another embodiment, only the cattle ID and the outcome of the sampled data analysis in form of cattle's status is transmitted to the ST unit.

Physical/Physiological Parameters Measurement
The tags are measurement devices of Physical/physiological parameters and measurements, such as, but not limited to, mobility, eating or other types of behavior measurement, such as tail and ears movement, breathing, trembling, pulse rate, or shivering in addition to measurement of temperature of the livestock.

The basic tag optionally includes additional sensor (or several sensors) for the purpose of which is measuring signs, behavior or symptoms that may provide information relevant to the cattle's health or illness state. These symptoms may be related to the cattle's mobility patterns. Illness in the livestock might cause weakness, resulting in slower movements, or a decrease in movement amounts of sick cattle for example. For that purpose, it is possible to use different kinds of sensors. Suitable sensors may be, but not limited to:

An accelerometer—measure amount of movements, speed of movement, mobility pattern, tail movement. It is possible to install more than one accelerometer so two or three axis measurements may be made. All accelerometers can be mounted perpendicular to each other.

Tilt sensor—may measure head movement and position, tail movement or possibly the rumination. It is possible to install more than one sensor so two or three axis measurements can be executed. All sensors can be mounted perpendicular to each other.

Piezo electric/piezo resistive sensor—for the measurement of tremor, shake, rumination or general movement count.

Proximity sensor, in a form of a capacitive, inductive, magnetic, photoelectric, ultrasound, RF or other type of proximity sensor—in order to measure proximity of cow to other herd members, proximity of cow to feeding pan, water tank, fence of feed lot or other options.

GPS—in order to monitor for a change in locomotion pattern (moves less, moves slower, moves to different sites of feed lot than usual), proximity to feeding pan, watering tank, fence or other).

Ambient Data Measurement

The basic tag (BT) may also provide information about the conditions in the cattle's environment, in terms of temperature and light, by measuring data from the following sensors:

Ambient temperature sensor—providing information about the environmental temperature proximal to the cattle's body. Such information may be relevant for cattle's body temperature calculation, as described hereunder.

Ambient light sensor detecting ambient daylight time—Information from this sensor may be cross-checked with other data such as movement or any other measured parameter, in order to aid the decision making process. Such a decision may be related to the normality of behavior or measured parameter pattern (for an example—an animal that is detected to be still for a long period may be considered to behave normally if it is night time, but not if it is day time). Information about daylight time might also be derived from the ambient temperature sensor by using the difference in ambient temperature between day and night time.

Data Processing Functionality

Optionally, the basic tag may process the data received from the different sensors on the tag. The data processing may be performed on the tag's MCU component and may include the next parameters/endpoints:

Cattle Temperature Calculation.

An algorithm used inside the MCU may be based on data received from the temperature sensor and/or ambient temperature sensor in order to eliminate the influence of the surrounding temperature on the temperature sensor and/or on the temperature of the cattle body itself. In this form, the calculation result is the cattle's body temperature.

Cattle Temperature State (High, Low, Normal).

The algorithm is using information received from temperature sensor combined with information from the ambient temperature sensor and/or additional sensors such as the ambient light sensor and/or other sensors used to measure physical/physiological parameters such as mobility, eating or other types of behavior measurement in order to calculate cattle's temperature state—normal, lower than normal, or higher than normal.

The information from the additional sensors is necessary in order to provide a decision about the normality of the cattle's temperature.

For an example cattle's body temperature may vary by time of day. The input from the ambient light sensor may provide the algorithm with the estimated time of the day (morning, noon, evening, night) so the decision about the temperature's value normality may be made according to the expected normal temperature range for this particular time of the day.

Another example—cattle's body temperature may vary as a result of hormonal changes, for example when a cow is 'in heat'.

Information indicating a hormonal change may be received from the different kinds of motion sensors as described herein. Hence, a cow in such a state is expected to be restless and thus move more.

Cattle Physical Sign/Physiological Parameter Normality

Depending on the implementation, the algorithm may use information received from one or more of the sensors of the BT: the ambient temperature sensor and/or additional sensors such as the ambient light sensor and/or other sensors used to measure physical/physiological parameters such as mobility, eating or other types of behavior measurement—in order to calculate cattle's normality of physical/physiological parameters.

As an example, the algorithm uses data from the motion sensor in order to calculate amount of movements made by the cattle, in order to determine regarding its normality.

An additional and detailed description of cattle's possible signs and symptoms of illness are found herein: "Possible signs and symptoms monitoring, using different kinds of motion sensor".

Optionally, a part of the data processing functionality may be an algorithm that cross-correlates outputs of different sensors to provide a decision about cattle potentially being in an alarm-requiring state.

Battery State

Battery state is monitored and compared to the predetermined threshold of voltage, below which the battery is considered low.

Data Transmission Functionality

Data acquired and/or calculated by the BT is transmitted to the ST along with the cattle ID. Data to be transmitted may be stored on the MCU's memory, or on an external device memory. The transmission may be executed via an RF, by implementing the transmitter located on the BT. Transmission-related different parameters such as: transmission encoding, protocol, rate and other parameters may be predefined for the CMS.

Alarm State Display to Farm Staff Functionality

The alarm display functionality is activated according to the results obtained by the data processing functionality of the tag. In case there is a need to signal an alarm (abnormal temperature and/or abnormal behavior and/or abnormal physical or physiological parameters measured, and/or low battery), the tag signals an alarm by at least one of the following components:

Activating a LED that helps visually identifying a sick animal in the lot or herd.

Activating a buzzer that aids for audio-identification of a sick animal in the lot or herd.

Figure 5:
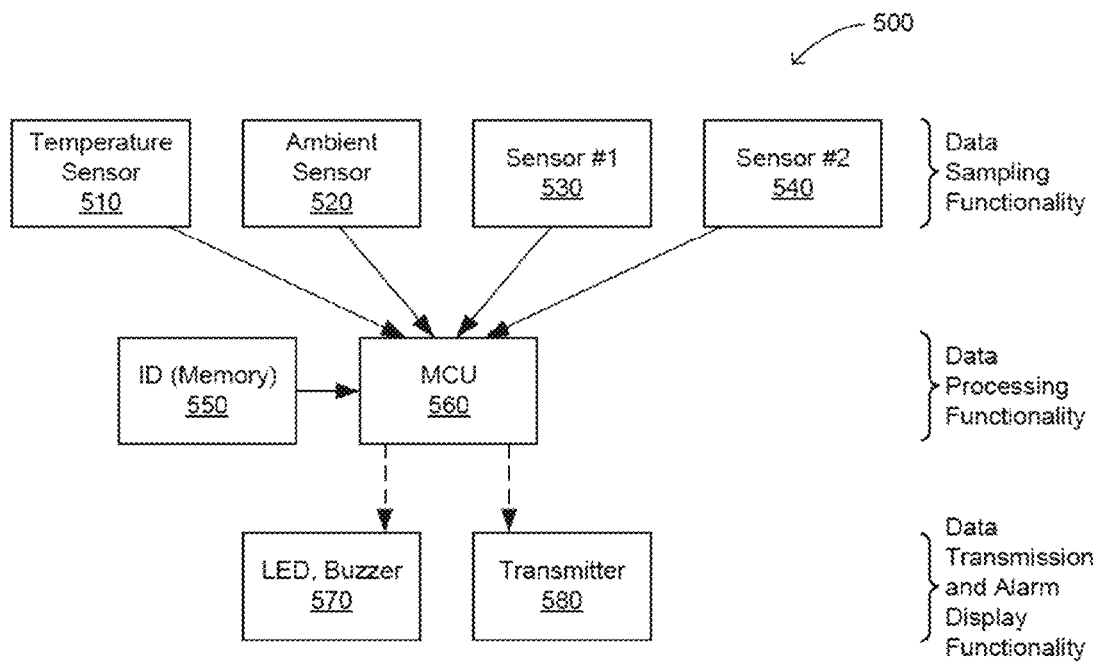
FIG. 5 shows a block diagram related to basic tag functions for the tag in FIG. 3.

FIG. 5 demonstrates the relations between different functionalities of the CMS in use of the basic tag BT 500. Data measured by sensor 510, sensor 520, sensor 530, and sensor 540 is transferred to MCU 560. Sensor #1 530 and #2 540 may be ambient light sensor, ambient temperature sensor, motion or proximity sensors as detailed in herein. Data processed in the MCU 560 as well as the ID of the livestock that is stored in ID memory 550 is forwarded (dashed arrows) to the transmitter 580. The processed information is also forwarded to the alarm-display components 570, activating them if necessary.

Smart Tag

Figure 6:
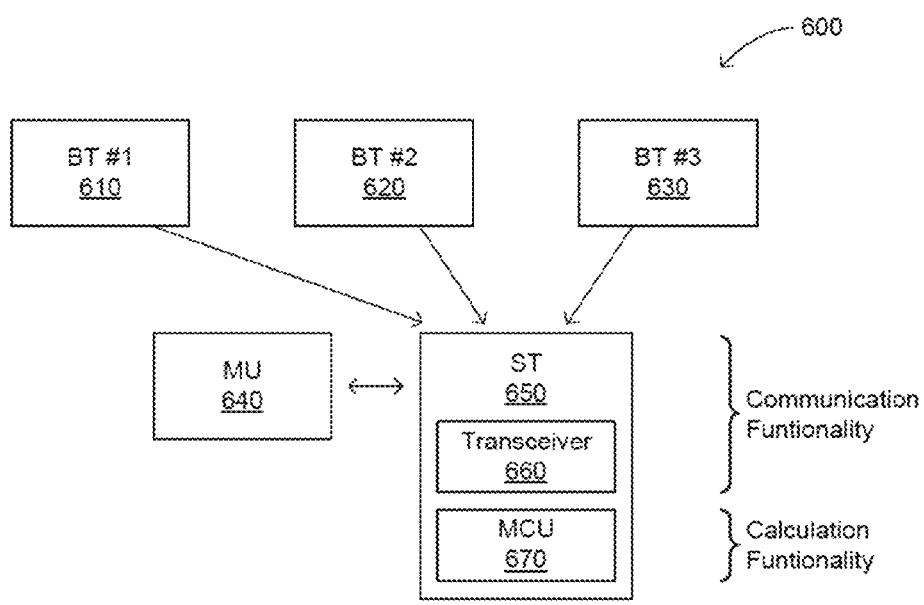
FIG. 6 shows a block diagram related to smart tag functions for the tag in FIG. 2.

FIG. 6 illustrates the Smart Tag (ST) 600 functionalities, and in particular are highlighted features that are not included in the BT. It is within the scope of the invention for ST to include in addition to its special features all the functions as well of the basic tag (BT). The data obtained from the different sensors, or the analysis output indicating the cattle status is transmitted from all BTs 610, 620, and 630 to the ST 650 as shown in FIG. 6.

The ST 650 is operating as a relay station between the basic tag units and the mobile unit 640, which collects the data from all of the animals being tagged. The smart tag performs all the basic tag functions as described herein and thus, the cattle which carries the smart tag can also be monitored. A transceiver 660 receives signals from the BTs. A MCU 670 within the Smart Tag computes the information from the BTs and from the livestock it is on, if applicable, and send the information onto the mobile unit MU 640.

Smart Tag Components

The ST components are identical to the BT components as listed herein, with exception to the transmitter, which is replaced in the ST by a transceiver 660. This enables the ST to send and receive signals, instead of just sending signals like the BT.

Smart Tag Structure

The ST structure is identical to the one of the BT described in FIG. 3, with the transmitter component replaced by a transceiver component 660.

Smart Tag Functionalities

The smart tag includes all the functionalities of the basic tag, as detailed in this specification. It also contains additional data processing functionalities and transmission functionalities as detailed hereunder. It may have the same form of the basic tag, or a different structure. It is also possible for the CMS not to include smart tags (in such case the system will include basic tags, mobile unit and a PC.

ST Functionalities (Additional to BT):

1. Data processing functionalities
2. Communication functionalities

Data processing functionalities—Calculation of time elapsed.

Such a calculation may be performed regarding last data transmission from of a particular BT to ST, or data transmission by ST to MU. This calculation may be performed by using an inner timer in the ST and BT.

The time elapsed is required in order to monitor for a lost signal or potentially a tag with a low battery, both of which may be suspected in case time elapsed from last data transmission (BT to ST) is longer than the predetermined period. As to data transmission from ST to MU—amount of time elapsed may be the method to set the next rendezvous between MU and ST. It is required in order to save the ST battery life, by reducing the time it stays in reception mode and limiting it to the rendezvous window.

Generation of Potentially Alarmed Tags List.

The ST may generate a list of all BT's ID in the feed lot that has transmitted an alarmed state (or sensor-measured information from the BT that was processed on the ST and was found to meet alarm criteria).

Communication Functionalities

All kinds of data transmission performed by the ST are executed by the transceiver component of the ST.

Data Reception From Basic Tag

The smart tag 600 allows data collection from several "basic" tags 610, 620, 630. The data is received via a transceiver 660 and is temporary stored in the ST's memory component and/or MCU component 670, in order to be later transferred to the MU 640 by means of RF communication, microwave signals or other communication signals.

Data Transmission to MU

One or more ST transmits to the MU a list of all the BT's IDs that are potentially in an alarmed state, as mentioned herein. The transmission may be executed via an RF or other signal, by implementing the transceiver located on the ST. Transmission-related different parameters such as: transmission encoding, protocol, rate and other parameters may be predefined for the CMS.

Data Reception from MU

Multiple STs may receive data from a single MU, such as but not limited to: type of information to transmit to MU (such as—full list of BT states, alarmed ST's only, alarmed of a certain kind only, or partial lists of such kind), time of next rendezvous, or other kinds of information. In other embodiments more than one MU may be utilized to allow other farm handlers access to the information.

Mobile Unit

As shown in FIG. 2, a mobile unit may only temporarily be present in the area of every feed lot (mobile by car or manually), and thus it is used for an occasional, predetermined and/or periodic data collection from the tags. The collected data is further transferred to the PC unit that may be located at the feed lot office, and used to process and store it for the system use.

Figure 8:
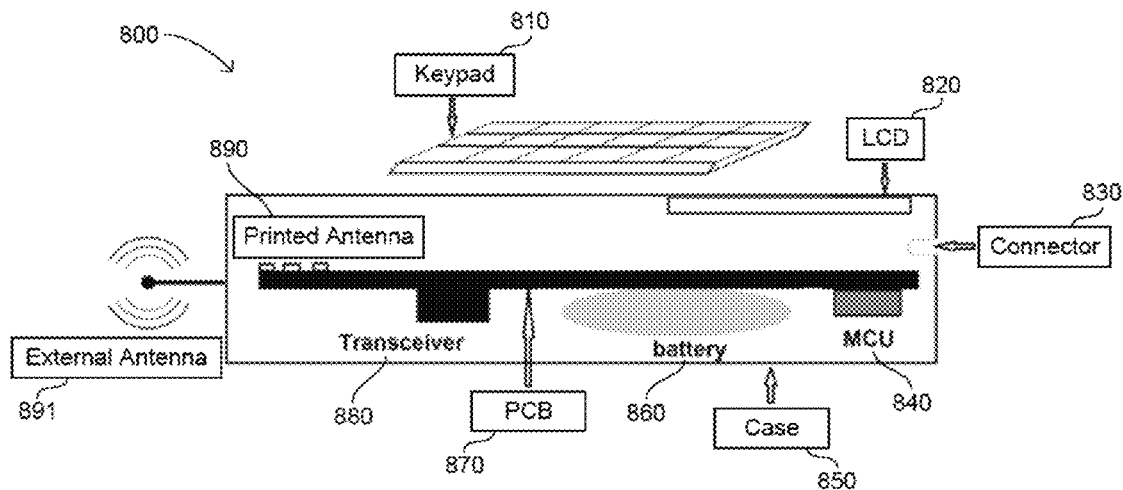
FIG. 8 shows a side view illustration of the inside of the mobile unit in FIG. 7.

A mobile unit or MU 800 may include one or more of the following components as shown in FIG. 8:

MCU 840
Transceiver 880
LCD (liquid crystal display) 820
Speaker (audio output)
Activation and control buttons on keypad 810
PCB printed circuit board 870
Case 850

Other components the MU may contain are optional components:

External memory
Rechargeable or disposable battery 860
Modem (cellular or other)
GPS
External antenna 891 and/or printed antenna 890
Connector 830

MU Structure

Figure 7:
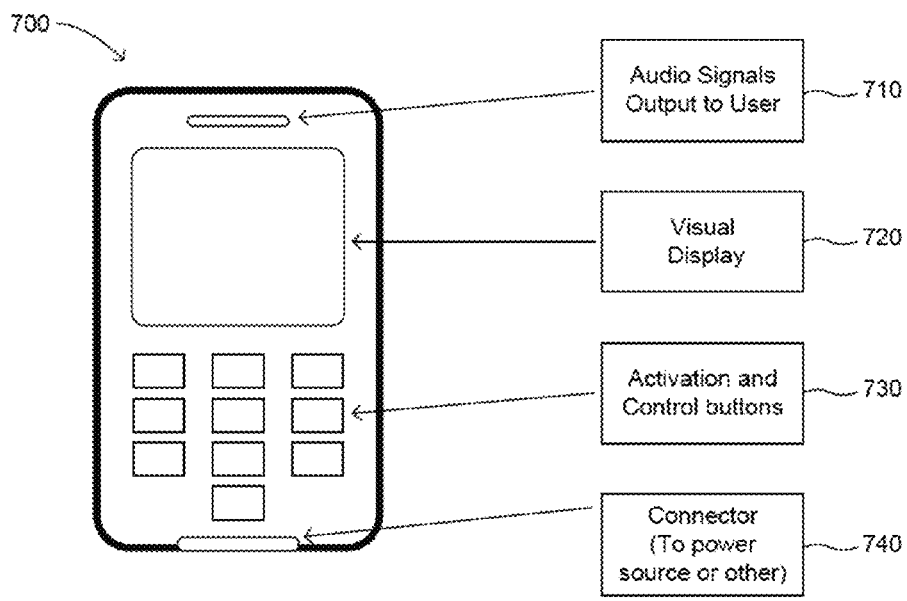
FIG. 7 shows an illustration of a mobile unit for use with the Basic and Smart tags in FIGS. 2-3.

Shown in FIG. 7 is mobile unit MU 700. MU 700 provides audio signals or output to users as shown in block 710. Further MU 700 has a visual display 720 to allow end users to monitor the well-being and movement and other physical and physiological features of the livestock. Activation and control button 730 allow the end user to control the MU 700. A connector 740 allows connection to a power source or other memory device or other device such as but not limited to a modem, GPS, computer, cellular phone, internet portal, charging station, or the like.

MU Functionality

The mobile unit allows a periodic collection of data stored in the STs. In order to collect the described data, the MU needs to be in a certain (predetermined) proximity to the cattle feed lot. The mobile unit is receiving instructions and tasks from the PC unit, by means of distal communication (RF) and/or manual communication (portable memory device). MU functionalities are:

Communication Functionality.
Communication With STS

Figure 9:
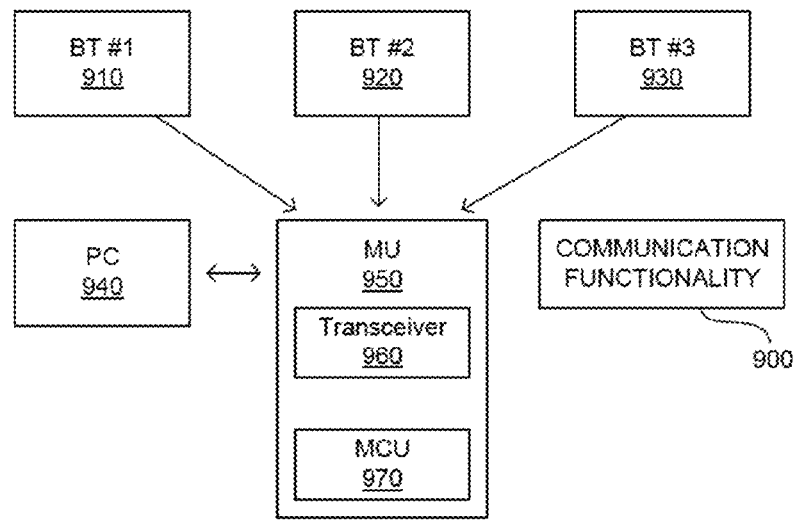
FIG. 9 shows a block diagram related to the mobile unit function for the unit in FIG. 7.

As shown in FIG. 9, the MU 950 receives a list of potentially alarmed BTs from the STs 910, 920, and 930, as described. The communication scheme 900 may be executed via an RF, by using the transceiver 960 located on the MU 950 or any other communication means depending on the embodiment. The communication with the STs may be done according to predetermined cycle or a rendezvous set with specific ST. Data is then stored on an external memory component such as PC 940 or MCU 970. ¶Relevant data to be sent to the STs is read from the MCU or external memory component, and sent to the STs via the transceiver. Transmission-related different parameters such as: transmission encoding, protocol, rate and other parameters may be pre-defined for the CMS.

Data Transmission and Communication With PC

Data received by the MU 950 is downloaded to the farm's PC 940 via the dedicated hardware (connector, such as but not limited to micro USB or USB). Optionally, data may be downloaded wirelessly in real time, by using a modem to transmit the information to the PC. Data is transferred from the MU memory to the relevant hardware via a pre-determined protocol.

In case of a wireless link between the MU and the PC unit, it also enables a dual way of communication between the PC and the MU units. The PC may send instructions or other information to the MU unit. ¶¶

PC Unit

The PC serves as a main data collection, processing, saving and task management unit. Data gathered from mobile units is processed in order to extract information regarding potentially sick animals, animals that need to be extracted from herd or lot, and related information. An additional aspect related to the PC unit is tasks and instructions transfer to the MU. Such instructions may include, but are not limited to: routine/special stock management tasks, feeding and maintenance tasks, sick animal treatment, follow-up tasks etc. The PC unit may support more than one MU, enabling coverage of large area by MU's.

Figure 10:
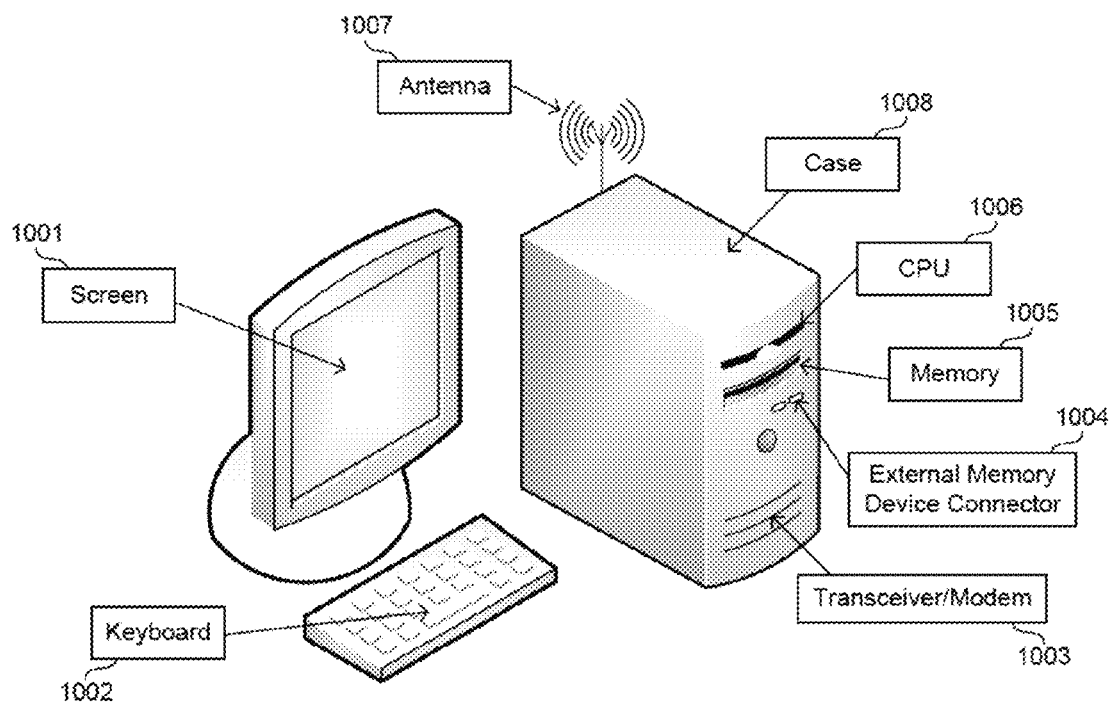
FIG. 10 shows an illustration of a stationary monitoring system for use with the Basic and Smart tags in FIGS. 2-3.

PC components include as shown in FIG. 10:

Screen 1001
Keyboard 1002
CPU (with suitable software) 1006
Memory 1005
Transceiver 1003 and antenna 1007
Optionally—connector for external memory device 1004
Case 1008

PC Structure

The PC (personal computer) is comprised from a screen and keyboard functioning as the user interface, and components that enable communication with the MU.

PC functionality includes for example, but is not limited to:

Communication and data collection functionality
Data processing and saving functionality
Task management and instruction generation functionality Communication and Data Collection Functionality The PC receives data collected by the MU. Such data contains an updated list of all cattle IDs that transmitted being in alarm state during the last visit of the MU in the feed lot range. Data is received and collected from the MU via a dedicated hardware (such as portable memory device) or via a wireless connection (such as modem, cellular modem or possibly an RF communication.

Data Processing and Saving Functionality

Data received from the MU is processed on the PC's CPU, creating an updated report regarding the cattle in the whole farm feed lots area. Types of information and parameters the report may include: number of cattle extracted from feed lot due to high temperature or due to other reason, alarms due to low battery and other parameters.

In addition, the data may be processed in order to extract statistical information such as: differences in amount of cattle with high temperature between different locations in the feed lot grid, differences on time scale or as a result of changes implemented in the farm (for an example: comparing amount of cattle with high temperature in different seasons of year, after changing the sort of feed or feeding protocol, etc.) Processed data is then saved on the PC's memory.

Task management and Instruction Generation Functionality.

Information extracted from the processed data may be used in order to generate instructions for farm staff. General instructions (for an example—need to contact veterinarian, change feed type or alike) may be kept on the PC, while instructions regarding cattle located in the feed lot (for an example—recheck cattle with a particular ID number returned from veterinarian, change tags with low batteries) may be transmitted to the MU.

Possible Signs And Symptoms Monitoring, Using Different Kinds of Motion Sensor

For the purpose of this section and this entire description, a "motion sensor" means any kind of sensor that may provide information regarding the cattle's movement, locomotion, location and dislocation, such as an accelerometer, tilt sensor, magnetic sensor, piezo electric/piezo resistive sensor, proximity sensor in a form of a capacitive, inductive , magnetic, photoelectric, ultrasound, RF or other type of proximity sensor , also as a GPS sensor or other options.

Detection of Cattle Movement Speed.

The motion sensor detects any changes of the cattle dislocation and movement speed. A slower moving herd or feed lot member may be suspected to be ill. Analysis of such sensor may include the average and the standard deviation of the animal's speed.

Detection of Movement Quantity.

The motion sensor detects each time the cattle moved during a pre-determined period of time. Hence sick cattle may not only moves slower, but also moves less times in general—such information may be valuable to monitor for illness. The movement count may also include posture changes (such as if the cattle changed its posture from laying to standing, or from standing to walking). Analysis of such sensor may include the frequency of movements and time duration of each movement as well as the acceleration related to each movement.

Abnormal Movement Pattern Detection.

The information obtained from the motion sensor may be used for a pattern-recognition algorithm, monitoring changes in cattle behavior when compared to recorded history of the same cattle unit, or history of the whole herd or feed lot. Abnormal movement pattern may be movements in a different time of the day, to a different distance speed or acceleration, using a different route or different timing (for an example: if the cattle usually walks the whole distance to its feeding pan at one continuous walk, it may be suspected as ill or injured if it breaks the same route into several walking attempts or segments). Abnormal movement pattern may occur resulting from stiff movements, dragged knuckles or toes, weakness, fever or other signs or symptoms of illness.

Optionally, the abnormal pattern recognition may be executed in real-time, by comparing current behavior of a particular animal in the feed lot to the rest of the animals in the lot.

Trembling or Shivering Detection.

A motion sensor may be used to detect a cattle that is shivering—a possible result of high fever or weakness, characteristic to some illnesses.

Tail Movement Detection.

The pattern of the tail movements changes in various situations: when the animal feels threatened, alarmed, curious, on heat or sick. Cattle suspected to be ill are less prone to move its tail. Such a decrease in tail movements may be detected using a motion sensor.

Head Lowering Detection

A healthy cattle is expected to eat, and thus lower its head in a pattern suitable with the feeding process. Sick cattle, on the other hand, will sometimes keep its head in a pattern that might be different from its eating pattern. A motion sensor that may sample information about head lowering sequences and patterns in time, may contribute information about the animal's wellbeing.

Eating-Related Movement Detection.

a. One of the symptoms of illness in cattle may be the lack of or reduced appetite. Hence the feeding process in cattle causes some characteristic movements of the jaw, also as tilt of the head and neck—which are possible to measure using a motion sensor.

b. In addition, information about the feeding of the cattle may be obtained from the movements of the cattle's abdomen: when the guts are filled less than normal, the cow will appear slab-sided, and a slight shake of the abdomen may occur during walk.

c. Another possible way to monitor the cattle's feeding is through rumination monitoring. The amount of times the cattle is ruminating and/or the process duration might be different between healthy and ill cattle. Such a difference may be monitored using different kinds of motion sensor or other type of sensors—such as the ones monitoring for rumination sounds. The sensor should be attached proximally to the cattle's neck, reticulum, rumen or other location where rumination takes place.

Combination of Movement and Eating Pattern

An ill cattle may present a different behavior regarding its feeding patterns, such as: making less attempts to check for potential feed in different locations of the feeding lot, spending different amount of time next to the feeding pan or water tank, or spending different amount of time making non-feeding activities next to the feed pan (such as self-grooming, social activity or other). Any change from a normal behavior pattern may be measured using a motion sensor. Specifically, for the purpose of monitoring the proximity of cattle to its feeding pan, a particular implementation of magnetic and/or electromagnetic proximity sensor may be used; In order to access the feed in the pan, the cattle is inserting its head through the metal bars of the fence surrounding the feed lot. Thus, a magnetic sensor located in the tag placed on the cattle may be used to sense the proximity to the metal and provide the CMS with information regarding feeding times and patterns. Alternatively, the proximity to the feeding pan may be monitored by using a short-range receiver placed on the pan, sensing the cattle tags from a pre-determined range.

Breathing Related Movement Detection.

An ill animal might suffer from breathing difficulties, expressed as labored breathing, increase in breathing rate and cough. A motion sensor measuring the relative movements of the animal's ribs or other location that is relevant to its respiratory system may provide with information regarding breathing deterioration.

Ear Movement and Position Detection

A possible sign of ill cattle is droopy ears. A motion sensor located on the cattle's ear and indicating the cattle's ear position regarding the ground, the cattle's head or other reference may provide with information about droopy ears and/or reduced ear movement.

Figure 11:
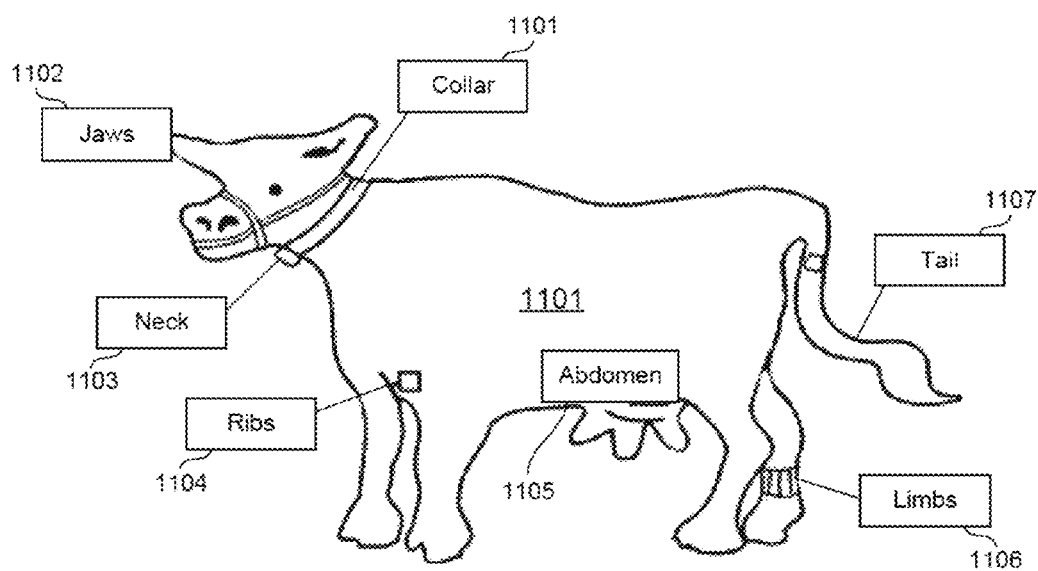
FIG. 11 shows an illustration of a livestock animal with potential tag sensor locations.

FIG. 11 illustrates the possible sensor location whether the sensor is a temperature sensor, or motion sensor or the like. Shown in FIG. 11 is a livestock animal in this case a cow or cattle 1100. Positions for the sensor or sensors may be placed by the gripper previously shown and described at several locations. Some locations include, but are not limited to, collar 1101, jaws 1102, neck 1103, ribs 1104, and abdomen 1105 limb 1106 such as leg or legs and tail 1107.

Figure 12:
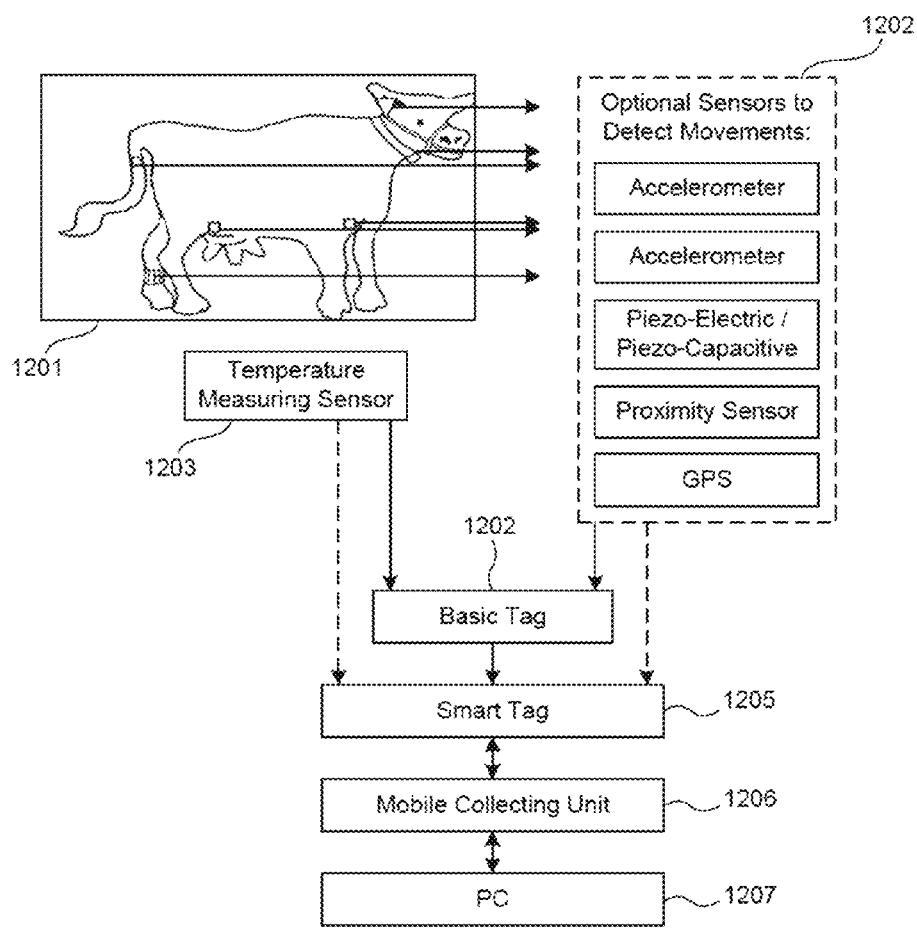
FIG. 12 shows a block diagram of data sampling and transmission for tag sensor locations.

FIG. 12 illustrates a block diagram of the livestock 1201 having sensors as shown in FIG. 11. Sensors may include for example optional sensors 1202 that include one or more of the following accelerometer, tilt switch, piezo electric/piezo capacitive, proximity sensor and/or GPS sensor. Information from these one or more sensors 1202 flow to BT 1204 and/or ST 1205 depending on the embodiment. Further BT 1204 relays information directly to ST 1205. Temperature measuring sensor 1203 also flows information to BT1204 and optionally directly to ST 1205. ST 1205 communicates with the MU 1206 sending and receiving information to and from the MU 1206. MU 1206 sends instructions to the ST 1205. MU 1206 is connected to PC 1207 that also sends and receives information through the MU 1206 and gives instructions through MU 1206.

System Functionality Description

Basic Tag

1. The data from all of the sensors located on the cattle is collected by the CPU and memory components on the BT. Data Output to the ST is in Form of: sampled raw data (such as voltage values sampled by the different sensors), or in the form of—; data processed into values (such as temperature and velocity values), or in the form of—threshold value (such as—normal or high temperature, normal or unexpected locomotion pattern), or in the form of—decision value: is the cow suspected to be ill or not.

2. The basic tag may transmit one or more of the following alarms regarding the cattle's wellbeing to the smart tag: about the cattle's temperature, eating or locomotion behavior.

3. Additional alarms transmitted by the basic tag may include: low battery, damaged tag or sensor.

4. The basic tag may transmit in case of a distress/error, or it may transmit data also if the cow is OK (no alarm requiring situation detected). Data output to ST includes also the cattle's ID.

Smart Tag

5. Data sampled from sensors may also be transmitted in its raw form from BT to ST. In such case, the raw data is processed in the ST in order to calculate measured values, threshold values or decision values (as described in previous descriptions of the basic tag functionality options).

6. The ST may use a database comprised of all tag ID's in a current lot, in order to allow a follow-up of the tags transmissions.

7. Optionally, only the last one or more transmissions of every basic tag will be saved in the ST. Alternatively, all the transmissions made to the ST in a pre-defined period of time (such as a day, two days, a week, etc.) may be saved in the ST dedicated component. For each transmission received there is an option to record the time of the transmission (in addition to tag's ID) which may be used for error analysis or alarm decisions.

8. No transmission from a basic tag during a period of 24 hours or other pre-determined period of time will be treated as an error: signal from basic tag is lost.

Figure 13:
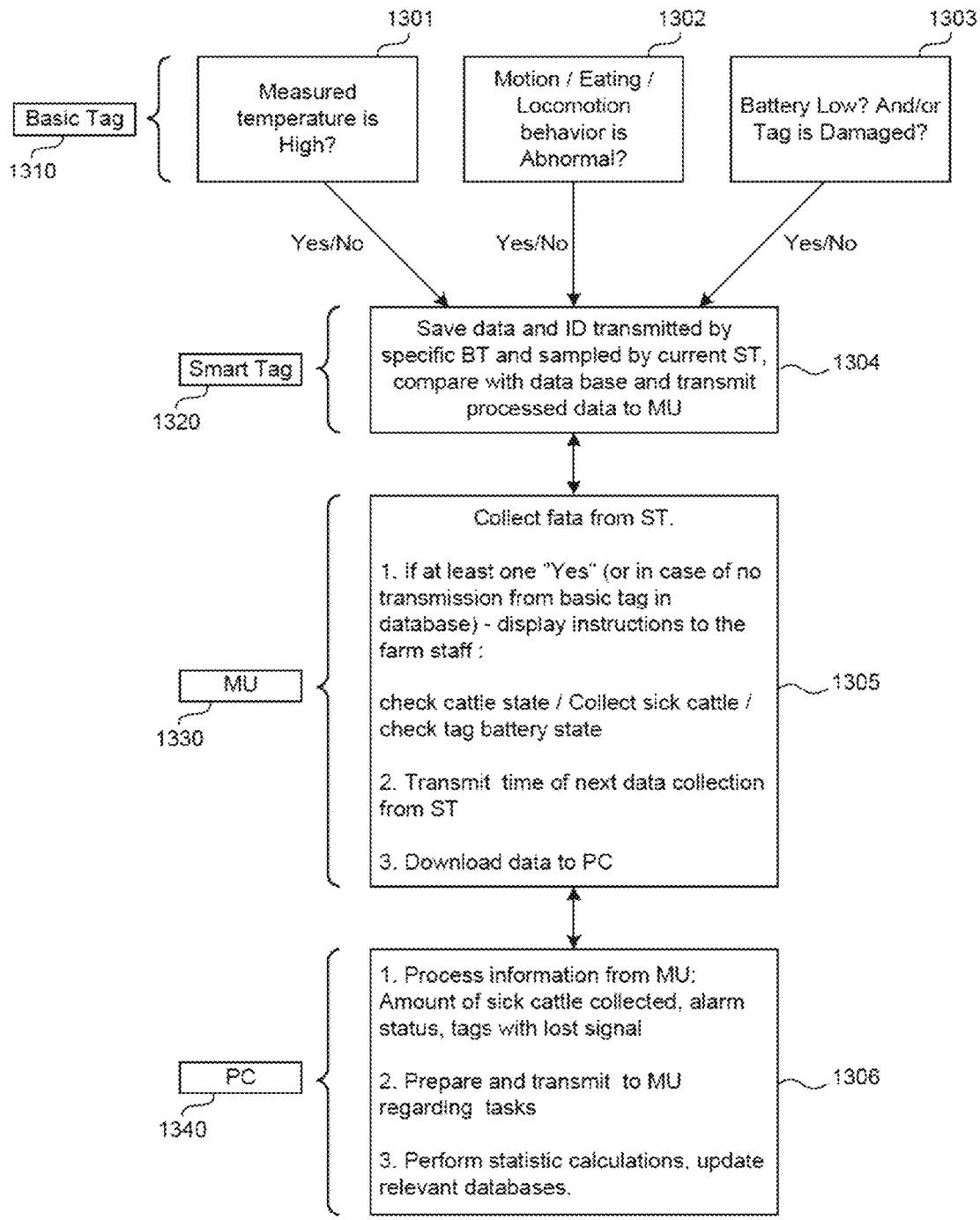
FIG. 13 shows a flow diagram for CMP system and/or CMS decision making process according to one embodiment.

In one embodiment, the decision making process of the CMP system may take the next form as shown in FIG. 13. Basic Tag 1310 identifies whether the animal temperature is high in block 1301. BT also determines motion, eating and other behavioral features in block 1302 BT also has the ability to identify whether the tag is damaged or the battery is low. All this information is communicated in this example to the Smart tag 1320.

In block 1304 the Smart tag saves data and has ID information transmitted by the specific BT and sampled by the current Smart tag (ST). The information is compared with a data base and information transmitted and process to a mobile unit (MU) 1330 in block 1305.

Depending on the embodiment, MU 1330 displays instructions to the farm staff and transmits time of next data collection as shown in block 1305. The information is also downloadable to a PC 1340. PC 1340 processes the information from the MU and prepares and transmits tasks to the MU. The PC 1340 also can perform statistical calculation and update all databases for further monitoring of the livestock.

Figure 14:
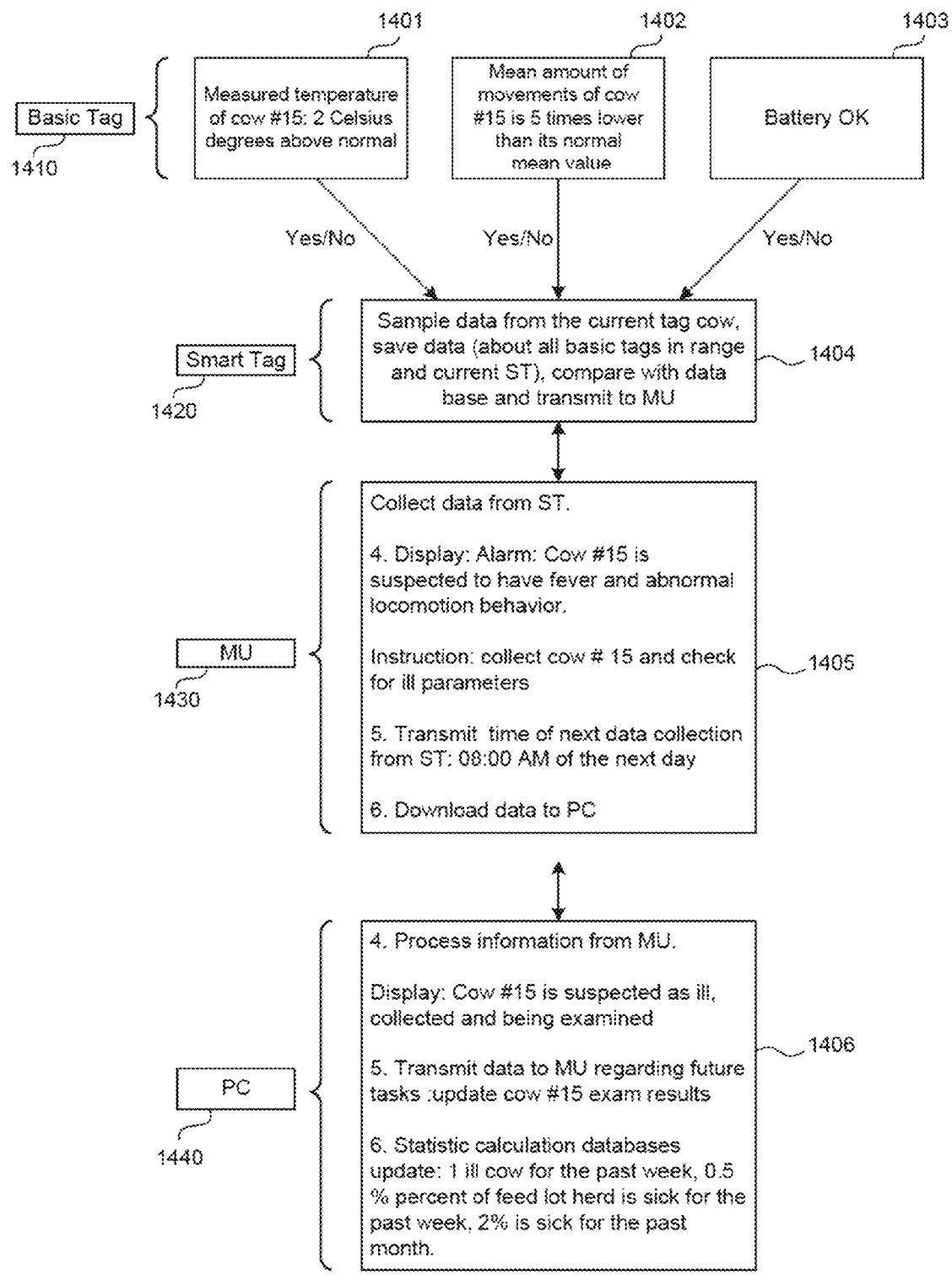
FIG. 14 shows a flow diagram for CMP system and/or CMS implementation for livestock with anomalous parameters.

FIG. 14 illustrates an example of CMS implementation in case of a cow with anomalous parameters. Basic tag 1410 measures a cow with above normal temperature in block 1401. In block 1402 the BT shows the mean amount of movements of the animal is significantly lower than its normal mean. In block 1403 the tag is reporting normal activity and function. All this information is transmitted to the ST 1420 in block 1404 where sample data from the current tagged cow is saved and compared with base data. This information is transmitted to MU 1430. The MU 1430 in block 1405 displays an Alarm for the cow and instructs the farm staff to collect the animal for observation and further testing. The information is downloaded to PC 1440 and time and date information is sent for the next data collection of the herd.

PC 1440 in block 1406 then processes the information from MU 1430 and displays that the cow is collected and being examined. Data is transmitted to the MU regarding future tasks and update on the collected cow. Statistical calculations may be performed on PC 1440 to update the percentage of ill animals per past week, month, year, and other statistical points of reference.

Figure 15:
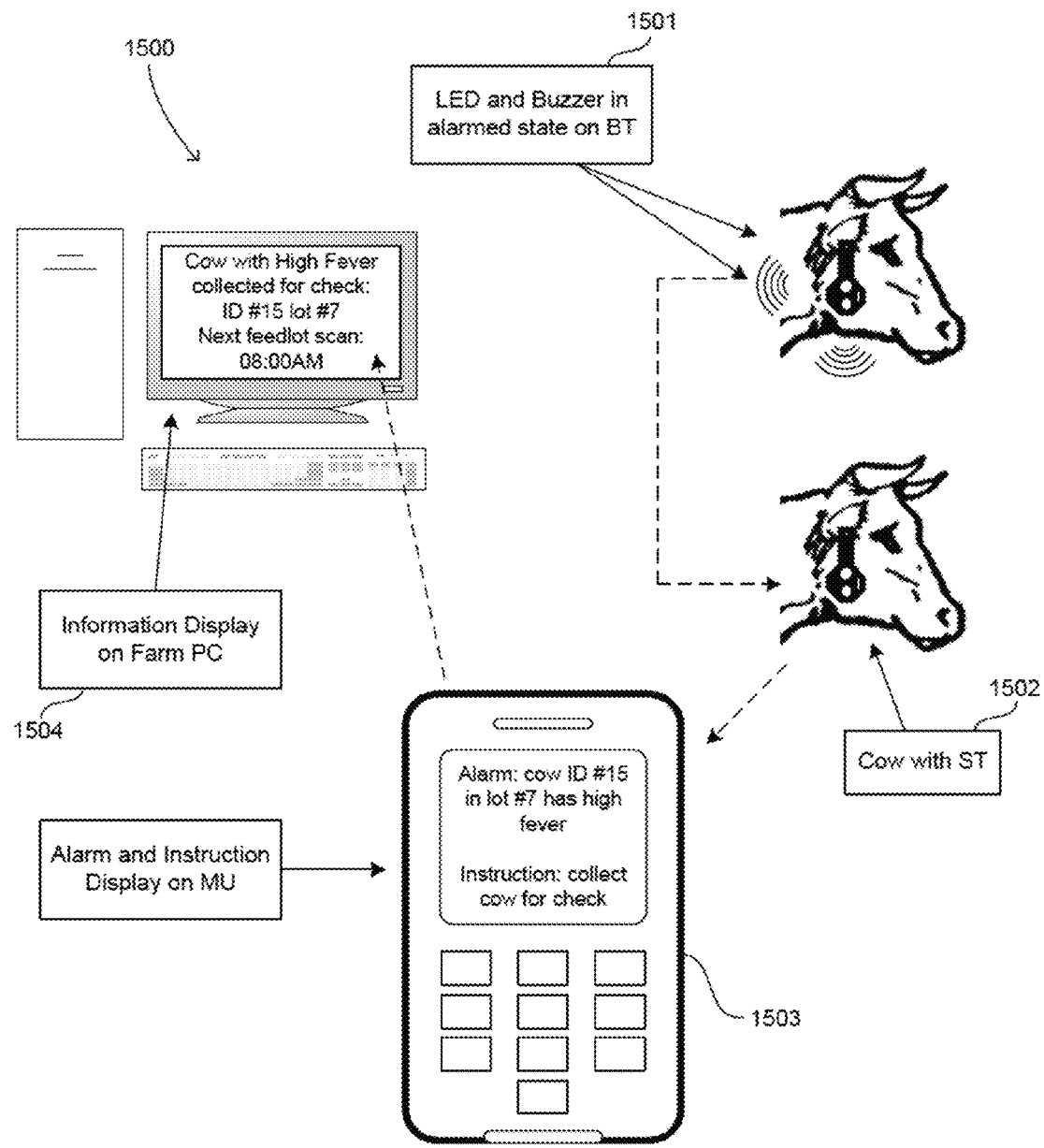
FIG. 15 shows an illustration of an example of CMS display for an alarm transmitting tag in FIG. 2-3.

FIG. 15 illustrates an alarm and instructions display on the MU. Shown is a CMS system 1500 having a MU 1503 and animals with BT 1501 and ST 1502. The ST 1502 transmits information to MU 1503 that the ST received from the BT 1501. Information is displayed on PC 1504 regarding the collection of the potentially ill animal.

Figure 16:
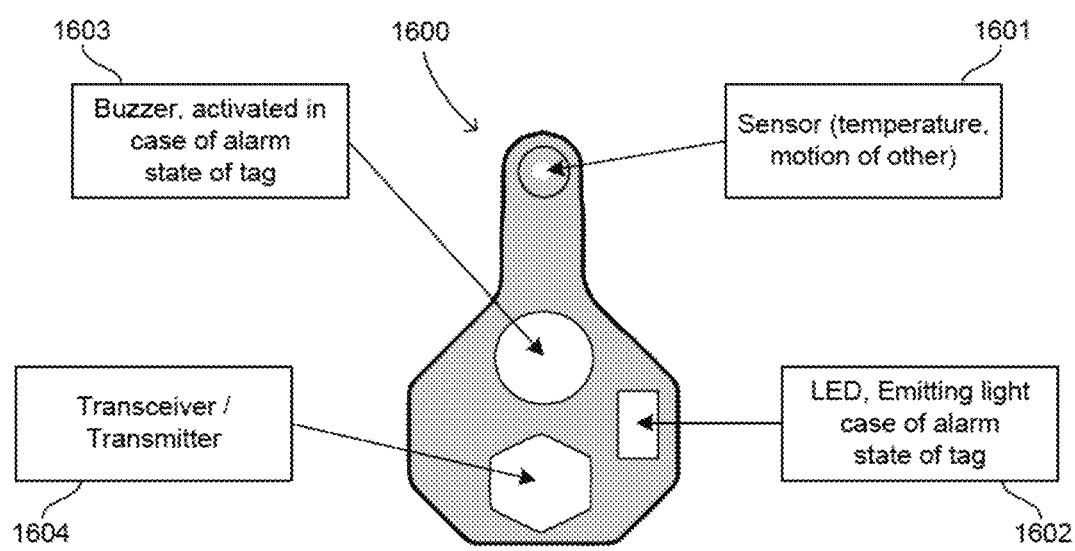
FIG. 16 shows an illustration of a tag for a Smart tag and/or Basic tag shown in FIG. 14.

FIG. 16 illustrates a legend of the ST and BT main components. Shown is tag 1600 having a sensor 1601 and LED 1602. The tag 1600 further contains a buzzer 1603 and a transmitter 1064. In the case of the ST the transmitter 1604 is a transceiver 1604 able to send and receive data, namely receive data from other BTs and/or STs and send the information to the MU and/or PC.

Figure 17:
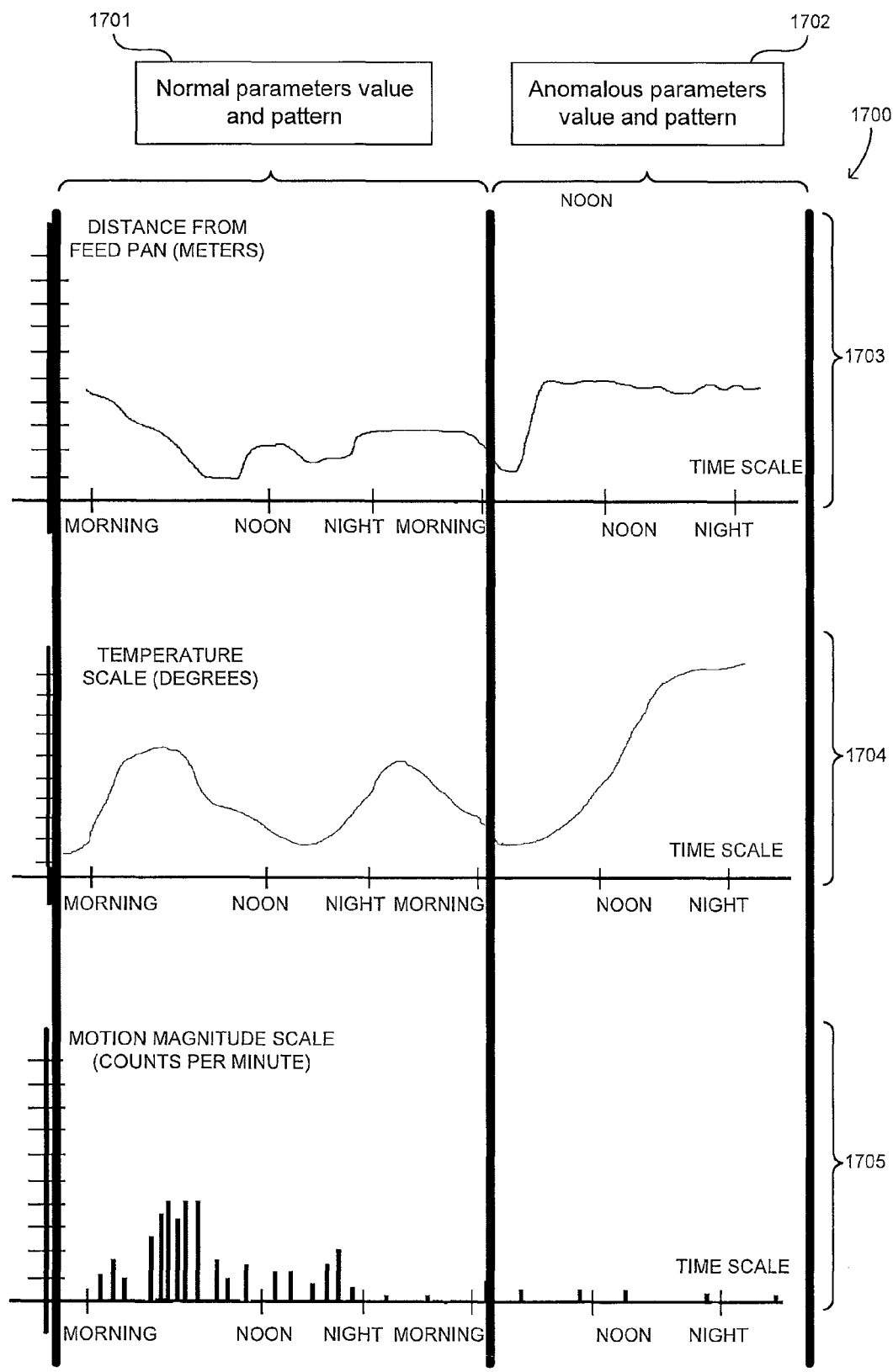
FIG. 17 shows a graphic depiction of an example of measured distance from feeding pan, motions quantity and temperature over a 48 hour period.

FIG. 17 demonstrates data sampling and processing by the CMS 1700: information regarding a single cattle unit motion and temperature is being gathered by the basic and smart tag. When processed and scaled over time, such information facilitates recognition of normal and anomalous parameter value and patterns. Shown are normal parameters value and pattern 1701 and anomalous parameters value and pattern 1702. Measured in this example is distance from feed pan 1703, temperature 1704 and magnitude of motion 1705. All this information is evaluated to identify the potential animal that carries an illness. The potentially ill animal is then detained and separated from the herd for further evaluation. Thereby, the risk of further exposure to a sick animal is minimized for the rest of the herd and cost savings are realized as well as healthier livestock due to this early detection.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for monitoring livestock animals and early detection of animal illness, comprising:
   at least one basic tag attached to a first animal for monitoring and collecting information regarding various physical and physiological features of the animal that is attached to the basic tag;
   at least one smart tag attached to a second animal; the smart tag receiving the information from the basic tag and processing information related to the health of the first and second animals;
   a mobile unit controller in communication with the smart tag; said mobile unit controller sending instructions to the smart tag to collect specific information and receive specific information; and
   a stationary unit for providing instructions to the mobile unit controller for monitoring of different signs or symptoms which are characteristic to ill livestock animals.

2. The system in claim 1, wherein the smart tag holds animal identification information of the first animal with the basic tag and sends the identification information to the mobile controller.

3. The system of claim 1, wherein the smart tag receives the information from the basic tag and the smart tag compares the information to previous information collected.

4. The system of Claim 3 wherein the comparison information generated by the smart tag is transmitted to the mobile control unit.

5. The system of claim 1, wherein the mobile unit receives the information from the smart tag and the mobile unit compares the information to previous information collected.

6. The system of claim 1, wherein the information sent includes at least one of: temperature reading, appetite behavior, movement increase or decrease, chewing behavior, stomach noises, tilting of animal, location of animal, posture of animal, pulse rate, and any combination thereof.

7. The system of claim 1, wherein the basic tag and the smart tag have an audible alarm that sound off when an animal has information sent that is not normal for that specific animal.

8. The system of claim 1, wherein the basic tag and the smart tag have a visual alarm that blinks on and off when an animal has information sent that is not normal for that specific animal.

9. The system of claim 1, wherein the basic tag and the smart tag have an audible alarm that sound off and a visual alarm that blinks on and off when an animal has information sent that is not normal for that specific animal.

10. The system of claim 1, wherein the stationary unit is a personal computer and stores history health data of the livestock animals and produces statistics concerning the health of the livestock.

11. A method for monitoring livestock animals and early detection of animal illness, comprising:
   using a basic tag attached to a first animal, the basic tag transmitting information regarding animal temperature, motion, and eating behavior and tag functionality;

using a smart tag attached to a second animal, the smart tag receiving information from the basic tag and transmitting identification data about the first animal; said smart tag further comprising the received information from the basic tag for the first animal to previously transmitted information for the first animal; and using a mobile control unit to receive the compared information from the smart tag and isolate the first animal if any signs of illness are reported by the basic tag.

12. The method of claim 11, wherein the smart tag also transmits information about the second animal to the mobile control unit.

13. The method of claim 11, further including using a stationary computer unit to collect the data from the mobile control unit and prepare statistics regarding the health of the livestock animals.

\* \* \* \* \*